US009025751B2

(12) United States Patent
Michaelis et al.

(10) Patent No.: US 9,025,751 B2
(45) Date of Patent: May 5, 2015

(54) SYSTEM AND METHOD OF MANAGING CONFERENCE CALLS THROUGH THE USE OF FILTERED LISTS OF PARTICIPANTS

(75) Inventors: Paul Roller Michaelis, Louisville, CO (US); Roger Toennis, Arvada, CO (US); Greg Weber, Westminster, CO (US); Doug Grover, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 1267 days.

(21) Appl. No.: 12/243,142

(22) Filed: Oct. 1, 2008

(65) Prior Publication Data
US 2010/0080375 A1    Apr. 1, 2010

(51) Int. Cl.
*H04M 3/42* (2006.01)
*H04L 12/18* (2006.01)
*H04M 3/56* (2006.01)
*H04L 29/08* (2006.01)
*H04Q 11/00* (2006.01)
*H04L 12/16* (2006.01)
*H04L 29/06* (2006.01)

(52) U.S. Cl.
CPC .............. *H04L 12/1822* (2013.01); *H04M 3/56* (2013.01); *H04L 65/1069* (2013.01); *H04L 65/403* (2013.01); *H04L 67/306* (2013.01)

(58) Field of Classification Search
CPC .................................................. H04M 2203/50
USPC ............. 379/202.01, 203.01, 204.01, 205.01, 379/206.01; 370/352, 353, 354, 355, 356, 370/357, 260, 261, 262; 455/416
See application file for complete search history.

(56) References Cited

U.S. PATENT DOCUMENTS

| 3,515,807 | A | | 6/1970 | Clark |
| 5,559,875 | A | | 9/1996 | Bieselin et al. |
| 5,619,555 | A | | 4/1997 | Fenton et al. |
| 5,668,863 | A | | 9/1997 | Bieselin et al. |
| 5,903,637 | A | * | 5/1999 | Hogan et al. ............. 379/203.01 |
| 6,088,435 | A | * | 7/2000 | Barber et al. ............ 379/205.01 |
| 6,457,043 | B1 | | 9/2002 | Kwak et al. |
| 6,480,885 | B1 | | 11/2002 | Olivier |
| 6,853,716 | B1 | | 2/2005 | Shaffer et al. |
| 7,266,189 | B1 | | 9/2007 | Day |
| 7,436,785 | B1 | * | 10/2008 | McMullen et al. ........... 370/261 |
| 7,707,262 | B1 | * | 4/2010 | Bill .............................. 709/207 |

(Continued)

FOREIGN PATENT DOCUMENTS

DE    102004041884    3/2006
WO    2007005468 A3    1/2007

OTHER PUBLICATIONS

U.S. Appl. No. 11/860,700, Swartz.

(Continued)

*Primary Examiner* — Ahmad F Matar
*Assistant Examiner* — Kharye Pope
(74) *Attorney, Agent, or Firm* — Sheridan Ross P.C.

(57) ABSTRACT

The system and method establish a conference call between a plurality of communication devices. Each communication device may have one or more participants. The number of participants on each communication device is determined. The system and method get a profile for each participant in the conference call. The profile contains at least one parameter. A filtered list of participants in the conference call is generated based on at least one parameter in the profiles. The filtered list of participants is then presented to various participants in the conference call.

41 Claims, 7 Drawing Sheets

(56) References Cited

U.S. PATENT DOCUMENTS

| | | |
|---|---|---|
| 8,326,927 B2 | 12/2012 | Asthana et al. |
| 8,611,521 B2 | 12/2013 | Aldrey et al. |
| 2002/0078153 A1* | 6/2002 | Chung et al. ................. 709/204 |
| 2002/0103864 A1* | 8/2002 | Rodman et al. .............. 709/204 |
| 2003/0068029 A1* | 4/2003 | McFarland .............. 379/202.01 |
| 2003/0112947 A1* | 6/2003 | Cohen .................... 379/202.01 |
| 2004/0006595 A1 | 1/2004 | Yeh et al. |
| 2004/0034723 A1* | 2/2004 | Giroti ................................ 710/8 |
| 2004/0047460 A1* | 3/2004 | Adams et al. ........... 379/202.01 |
| 2004/0047461 A1* | 3/2004 | Weisman et al. ........ 379/202.01 |
| 2004/0218744 A1* | 11/2004 | Nguyen et al. .......... 379/202.01 |
| 2005/0018826 A1 | 1/2005 | Benco et al. |
| 2005/0069115 A1* | 3/2005 | McKnight et al. ....... 379/202.01 |
| 2005/0074107 A1* | 4/2005 | Renner et al. ............ 379/202.01 |
| 2005/0238156 A1* | 10/2005 | Turner .................... 379/202.01 |
| 2006/0067499 A1* | 3/2006 | Oliveira et al. .......... 379/202.01 |
| 2006/0222155 A1* | 10/2006 | Summers et al. ........ 379/202.01 |
| 2006/0285672 A1* | 12/2006 | Levy et al. ............... 379/202.01 |
| 2007/0047715 A1* | 3/2007 | Madhusudan et al. ... 379/202.01 |
| 2007/0091831 A1* | 4/2007 | Croy et al. .................... 370/260 |
| 2007/0274492 A1* | 11/2007 | Baker et al. ............. 379/202.01 |
| 2008/0031433 A1 | 2/2008 | Sapp et al. |
| 2008/0159510 A1* | 7/2008 | Julien et al. ............. 379/202.01 |
| 2008/0259824 A1* | 10/2008 | Frankel ........................ 370/260 |
| 2009/0067602 A1* | 3/2009 | Rudolph .................. 379/202.01 |
| 2009/0214016 A1* | 8/2009 | O'Sullivan et al. ...... 379/202.01 |

OTHER PUBLICATIONS

Search Report for United Kingdom Patent Application No. GB0913223.4, dated Oct. 1, 2009 4 pages.

Examination Report for United Kingdom Patent Application No. GB0913223.4, dated Apr. 26, 2013 3 pages.

Official Action (with English translation) for German Patent Application No. 102009041847.4, mailed Dec. 15, 2014, 25 pages.

* cited by examiner

SYSTEM AND METHOD OF MANAGING CONFERENCE CALLS THROUGH THE USE OF FILTERED LISTS OF PARTICIPANTS

TECHNICAL FIELD

The system and method relates to conference call systems and in particular to systems and methods for managing conference calls.

BACKGROUND

Currently, some conferencing systems are capable of determining participants on a conference call. Moreover, some conferencing systems use predefined profiles to set up teleconferences. However, these systems fail to leverage the use of profiles in conjunction with determining the participants on a conference to provide rich dynamic filtering of the participants and their roles within the conference.

For example, U.S. Pat. No. 7,266,189 describes a system that identifies participants in a teleconference by recording the participant's voice. This allows the system to identify the last person who spoke on the teleconference. The problem with this solution is that it fails to leverage profiles, does not generate a filtered list of participants in the conference call, and does not allow the participants to use the filtered lists of participants.

Patent Application No. 2004/0006595 discloses a system that creates a profile for users of teleconference services. Using profiles, a user can create a side conference within a conference where only selected members of the conference can communicate. The problem with this solution is that the profiles are not used to create filtered lists of participants on a conference call. Since the system does not generate filtered lists of call participants, the system does not allow the participants to use the filtered lists of participants.

U.S. Pat. No. 5,668,863 describes a system that allows a participant in a conference call to record their name followed by a Dual-Tone Multi-Frequency (DTMF) tone to record who was on a conference call. This system fails to leverage profiles, does not generate filtered lists of participants in a conference call, and does not allow the participants to use the filtered lists of participants.

SUMMARY

The system and method are directed to solving these and other problems and disadvantages of the prior art. The system and method establish a conference call between a plurality of communication devices. Each communication device may have one or more participants. The number of participants on each communication device is determined. The system and method get a profile for each participant in the conference call. The profile contains at least one parameter. A filtered list of participants in the conference call is generated based on at least one parameter in the profile. The filtered list of participants is then presented to various participants of the conference call.

BRIEF DESCRIPTION OF THE DRAWING

These and other features and advantages of the system and method will become more apparent from considering the following description of an illustrative embodiment of the system and method together with the drawing, in which.

DETAILED DESCRIPTION

Figure 1:
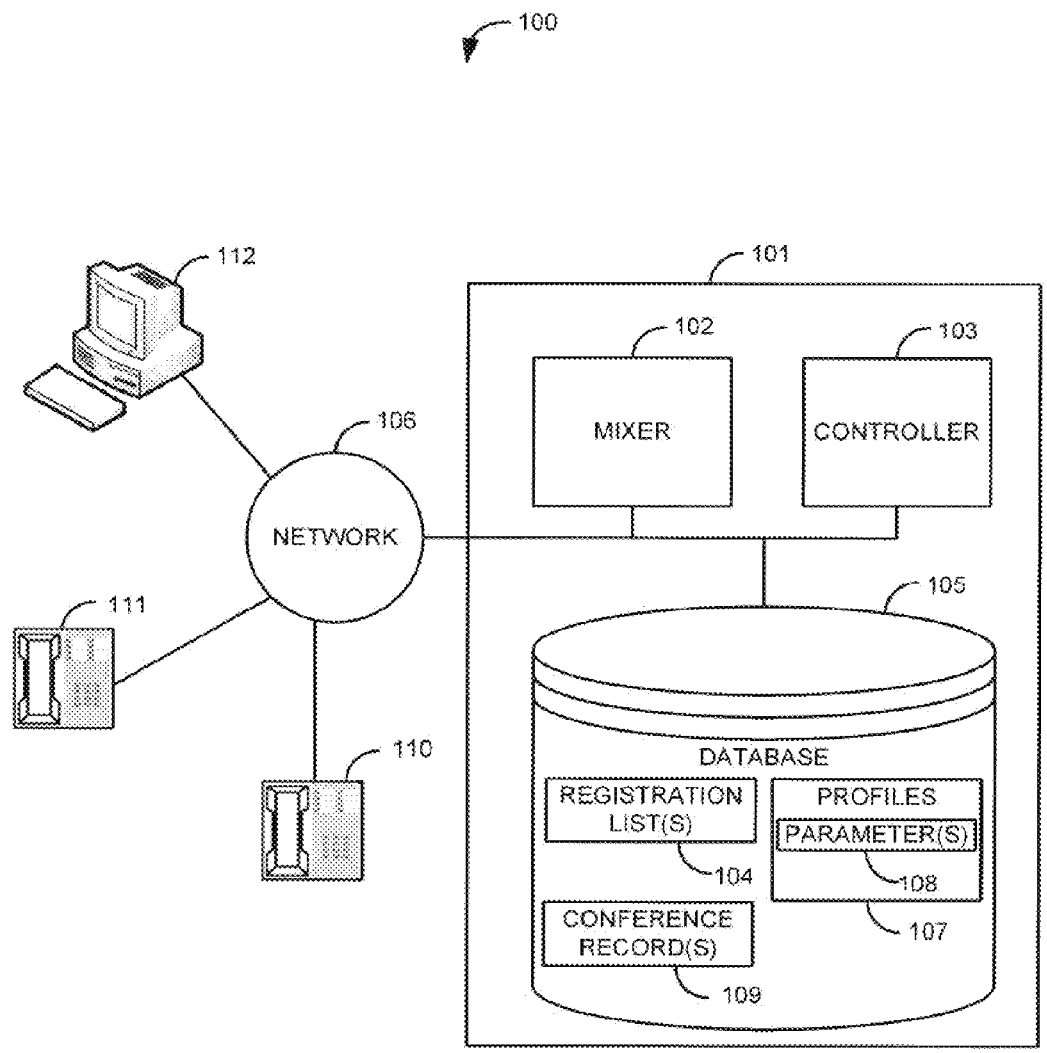
FIG. 1 is a block diagram illustrating a system for managing conference calls through the use of filtered lists of participants.

FIG. 1 is a block diagram illustrating a system 100 for managing conference calls through the use of filtered lists of participants. The system 100 comprises a conference manager 101, a network 106, and communication devices 110-112. The conference manager 101 further comprises a mixer 102, a controller 103, and a database 105. The database 105 contains registration list(s) 104, profiles 107, and conference records 109. The profiles 107 contain at least one parameter 108.

The communication devices 110-112 could be any device that can communicate over a network 106, such as a telephone, a Personal Computer (PC), a cellular telephone, a Personal Digital Assistant (PDA), and the like. In this example, communication device 110 is a PC and communication devices 111-112 are telephones. The conference manager 101 could be any system capable of creating conference calls, such as an Interactive Voice Response (IVR) system, a Private Branch Exchange (PBX), a server, a router, a gateway, and the like. The mixer 102 could be any device capable of mixing conference calls, such as a PBX, a server, a router, an IVR system, a gateway, and the like. A conference call could be a voice conference call, a video conference call, a chat conference call, a multimedia conference call, and the like. The controller 103 could be any device capable of controlling a conference call, such as a PC, a PBX, an IVR system, a server, and the like. The controller 103 is capable of converting voice messages into text and text messages into voice messages. The database 105 can be any type storage system, such as a relational data base, a directory service, a flat file system, and the like. The network 106 could be any type of network, such as a wired network, a wireless network, a fiber optic network, and the like.

The registration list 104 is a list of known identifiers associated with one or more communication devices 110-112, such as a telephone number, a telephone prefix, a Session Initiation Protocol (SIP) alpha-numeric number, a Universal Resource Locator (URL), and the like. For example, the registration list 104 could be a list of telephone numbers and names for members of a department or company. A profile 107 is associated with a participant on a conference call. A profile 107 contains at least one parameter 108. A parameter 108 in the profile 107 could be a telephone number, a name, a title, a company, a telephone prefix, a time duration, a start time, a stop time, and the like. The conference record 109 is a record of the conference call that is generated during and/or after the conference call. The conference record 109 contains the participants' profiles 107 and other information, such as the time each participant was on the conference call, the duration of the conference call, and the like.

A participant on communication device 110 calls the mixer 102 to set up an initial conference call. The controller 103 examines the telephone number from communication device 110 and determines that there is a profile 107 associated with that telephone number in database 105. The controller 103 gets the profile 107 from the database 105 for the participant on communication device 110.

A participant on communication device 111 calls the mixer 102 to connect into the conference call. The controller 103 examines the telephone number from communication device 111 and determines that there is a profile 107 associated with that telephone number in database 105. The controller 103 gets the profile 107 from the database 105 for the participant on communication device 111. The mixer 102 establishes a conference call between communication devices 110 and 111.

A participant on communication device 112 calls the mixer 102 to join the conference call. The controller 103 examines the telephone number from communication device 112 and determines that there is a profile 107 associated with that telephone number in database 105. The controller 103 gets the profile 107 from the database 105 for the participant on communication device 112. The mixer 102 establishes a three way conference call between communication devices 110-112.

Upon receiving a request to generate a filtered list of participants, the controller 103 generates a filtered list of participants based on the criteria of the request and at least one of the parameters 108 in a profile 107. Once the conference call is complete, a conference record 109 that includes the filtered list is stored. The filtered list of participants can later be retrieved from the conference record 109. This allows a participant to determine exactly who was on the conference call and their role in the conference call if the need later arises.

As an example of using system 100, the profile 107 for the participant on telephone 110 contains the following parameters 108: 1) telephone extension: 110, 2) name: Jane Doe, 3) company: Avaya, and 4) title: engineer. The profile 107 for the participant on telephone 111 contains the following: 1) telephone extension: 111, 2) name: Jack Hammer, 3) company: Avaya, and 4) title: manager. The profile 107 for the participant on telephone 112 contains the following: 1) telephone extension: 112, 2) name: Bob Smith, 3) company: XYZ Inc., and 4) title: engineer.

The controller 103 is an Interactive Voice Response (IVR) system that can convert voice to text and text to voice. The participant in the abovementioned three-way conference on telephone 110 (Jane Doe) says the command "filter company Avaya". The controller 102 converts the command into text and generates a filtered list of the conference participants that only contains participants from the company Avaya. In this example, the filtered list of participants would contain Jane Doe and Jack Hammer. The controller 103 presents the filtered list of participants by playing back to Jane Doe on telephone 110 the message: "Jane Doe and Jack Hammer are from Avaya." This same message could also be displayed on telephone 110. The message could also include other parameters 108 in the profile 107. For example, the played back message could state: "Jane Doe at extension 110 and Jack Hammer at extension 111 are from Avaya."

In a second example, Jane Doe wants the same filtered list of participants; however Jane Doe wants all participants from Avaya to hear the message. In this example Jane Doe says "filter company Avaya" and enters a DTMF tone *7 (which indicates to play to all members in the filtered list of participants). The message "Jane Doe and Jack Hammer are from Avaya" is now played to Jane Doe on telephone 110 and Jack Hammer on telephone 111.

In another example, Jane Doe is the host of the conference call and wants to playback to all participants in the conference call each caller's name, title and company. Jane Doe enters *1 (which indicates play each participant's name, title, and company) and the following message is played back on communication device 110-112: "Today's conference attendees are: Jane Doe an engineer from Avaya, Jack Hammer a manager from Avaya, and Bob Smith an engineer from XYZ Inc."

Figure 2:
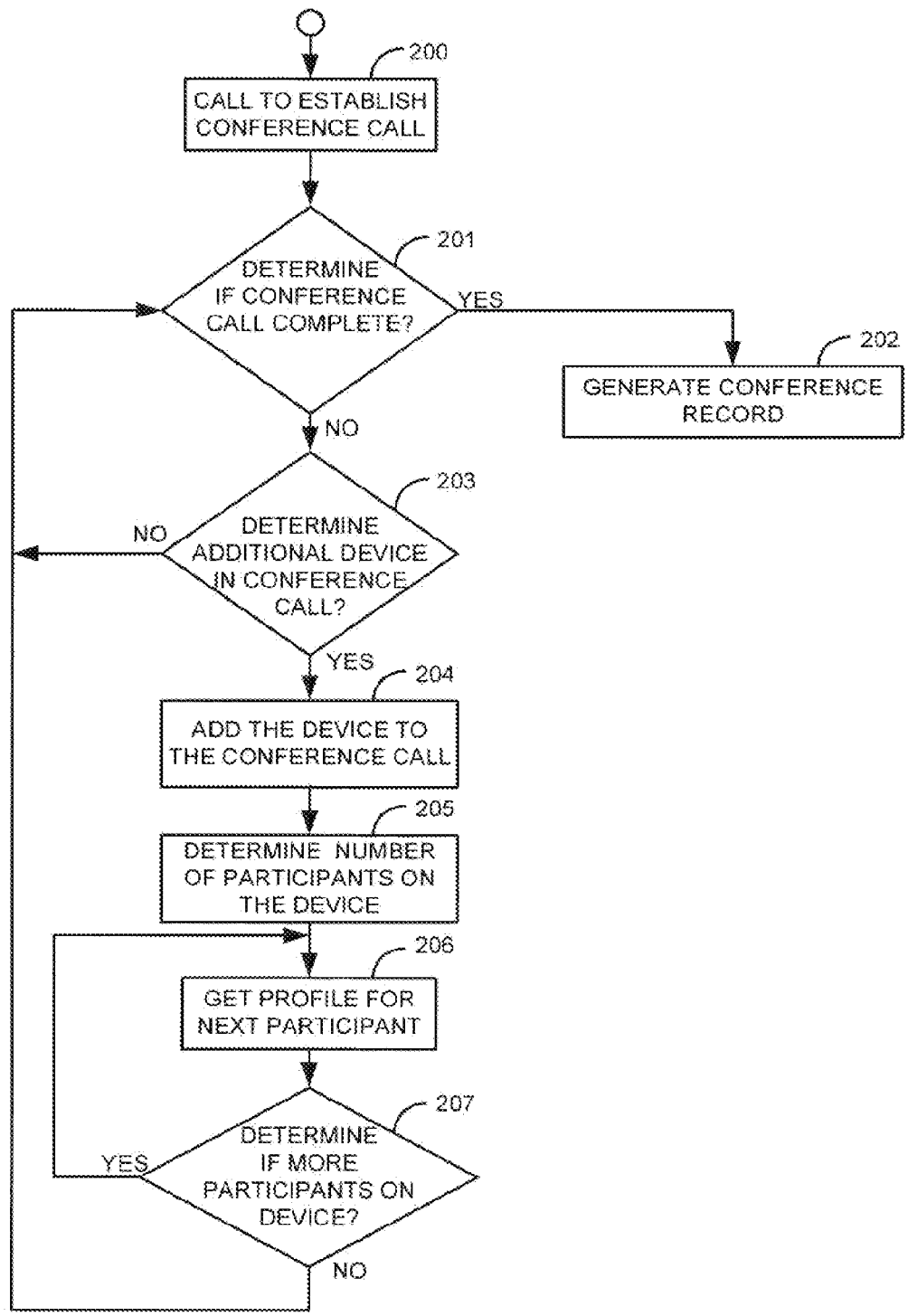
FIG. 2 is a computer-implemented method for determining the number of participants on a communication device as the communication device connects to the conference call.

FIG. 2 is a computer-implemented method for determining the number of participants on a communication device 110-112 as the communication device 110-112 connects to the conference call. Illustratively, the mixer 102 and the controller 103 are stored-program-controlled entities, such as one or more computers, which perform the method of FIGS. 2-7 by executing programs stored in storage media, such as a memory or disk. The process begins when a communication device 110-112 first calls 200 the mixer 102 to establish a conference call. The mixer 102 determines 201 if the conference call is complete. If the conference call is complete, the mixer 102 generates 202 a conference record 109 and stores the conference record 109 in the database 105.

Otherwise, if the conference call is not complete in step 201, the mixer 102 determines 203 if an additional communication device 110-112 is to be added to the conference call. For example, when a call is placed to a conference bridge, the mixer 102 based on the code adds an additional communication device 110-112 to the conference call. If an additional communication device 110-112 is not ready to be added to the conference call in step 203, the mixer 102 determines 201 if the conference call is complete. Otherwise, the mixer 102 adds 204 the communication device 110-112 to the conference call.

The controller 103 determines 205 the number of participants on the communication device 110-112. There are various ways that the controller 103 can determine the number of participants on a communication device 110-112. For example, in a conference room, one of the participants can enter the number of participants in the conference room by entering the number of participants followed by the # key on the keyboard of the communication device 110-112.

The controller 103 gets 206 the profile 107 for a participant. Getting 206 the profile 107 for a participant can happen in various ways. For example, the profile 107 could already be defined in the database 105. Another way of getting 206 a profile 107 could be by looking up the communication device 110-112 in a registration list 104 and generating a profile 107 from the registration list 104. For example, the registration list 104 can have a list of telephone numbers that are trusted telephone numbers for the company. The generated profile 107 indicates that the participant is an employee of the company. The registration list 104 can also contain a telephone prefix that indicates that all telephone numbers with the prefix are trusted telephone numbers of employees of the company. The registration list 104 can also indicate if the telephone number is an individual participant's phone number or a conference room. From the telephone number of conference room telephone number, the controller 103 can determine 205 that there may be multiple participants on a communication device 110-112.

The controller 103 determines 207 if more participants are on the communication device 110-112. If there are more participants on the communication device 110-112, the process goes to step 206. An example of how the controller 103 can get a profile 107 for multiple participants on a single communication device 110-112 could be where the controller 103, after determining 205 the number of participants, asks for the participant's name followed by the a *, the participant's company followed by the * and the participant's title followed by the #. This process (step 206) would then be repeated by each participant on the communication device 110-112. The number of participants can be determined 205 at the end of step 206 by getting the last profile 107 from the last participant where the last participant enters a unique code such as ## to signify that he/she is the last participant. If the controller 103 determines 207 that there are no more participants on the communication device 110-112, the process goes to step 201.

The process in steps 204-207 could be implemented in a parallel process for each communication device 110-112 after the communication devices 110-112 are connected into a conference call. For example, if communication devices 110-112 are connected in a conference call, the controller 103 could generate a thread for each communication device 110-112 that implements steps 204-207. Once there are no more participants on the communication device 110-112 in step 207, the thread is complete.

Figure 3:
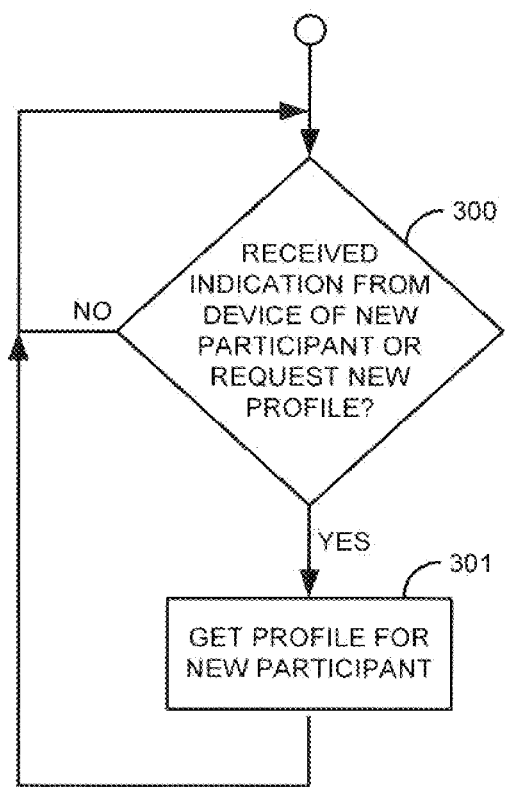
FIG. 3 is a computer-implemented method for adding a new participant to a communication device that is already connected to a conference call or requesting a new user profile.

FIG. 3 is a computer-implemented method for adding a new participant to a communication device 110-112 that is already connected to a conference call or for requesting a new profile 107. After a communication device 110-112 has already been added 204 to the conference call as described in FIG. 2, FIG. 3 allows a participant to be added after the fact. On a communication device 110-112 that has already been added in step 204, the controller 103 receives 300 an indication from the communication device 110-112 of a new participant on the communication device 110-112. The controller 103 gets 301 the profile 107 for the new participant. The controller 103 waits to receive 300 an indication of a new participant or a request for a new profile 107. For example, assume Jack called in from his office using the process described in FIG. 2. If Sally joined Jack in his office after the conference had started, the controller 103 can get a profile 107 of Sally. Sally could enter a *7 (code to add a user profile 107) 300 followed by her name *, company *, title #, thus allowing the controller 103 to get 301 Sally's profile 107.

The method of FIG. 3 can also be used to update an existing profile. If the controller 103 receives 300 a request for a new profile, then the controller 103 gets 301 the new profile for the participant. This way a user can change any or all parameters 108 in his/her profile 107.

Figure 4:
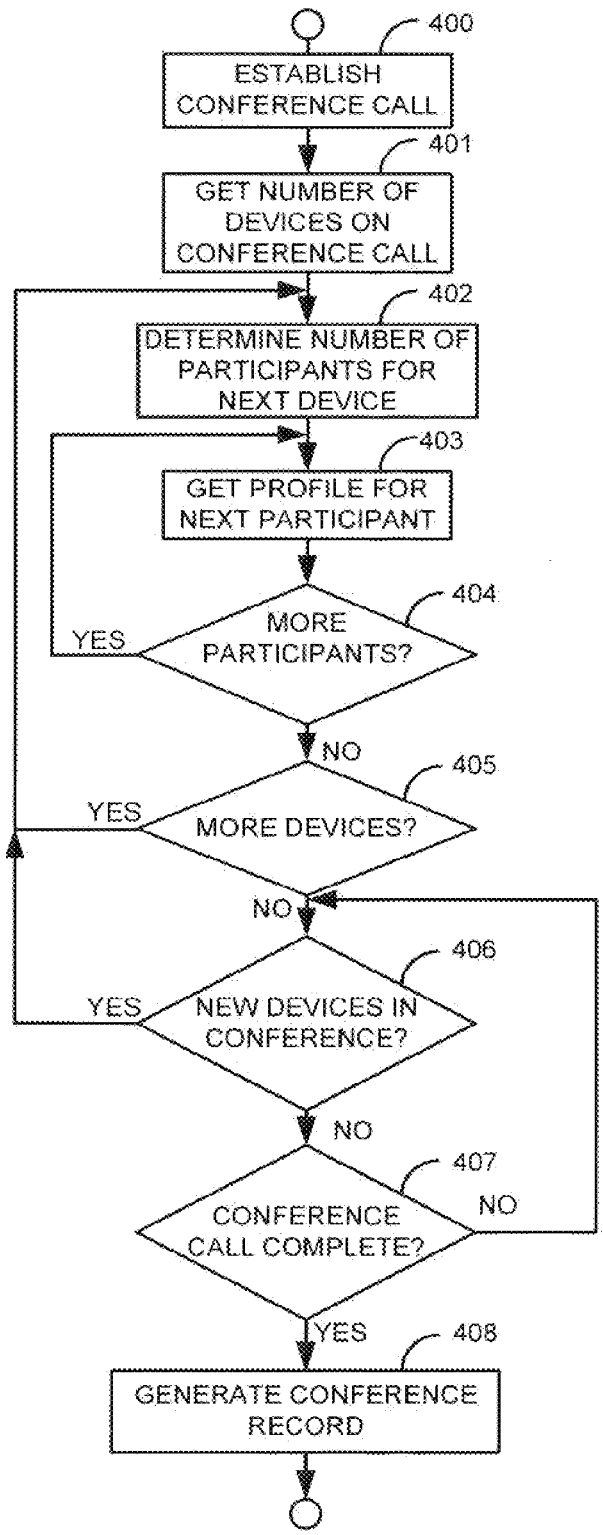
FIG. 4 is a computer-implemented method for determining the number of participants sequentially.

FIG. 4 is a computer-implemented method for determining the number of participants sequentially. The process begins when a conference call is established 400 between two or more communication devices 110-112. The controller 103 gets 401 the number of communication devices 110-112 on the conference call. The controller 103 determines 402 the number of participants for the next communication device 110-112. The controller 103 gets 403 a profile 107 for the next participant on the communication device 110-112. The controller 103 determines 404 if more participants are on the communication device 110-112. If there are more participants on the communication device 110-112 in step 404, the process gets 403 the profile 107 for the next participant.

Otherwise, the process determines 405 if there are more communication devices 110-112 on the conference call. If there are more communication devices in step 405, the controller 103 determines 402 the number of participants for the next communication device 110-112. Otherwise, the controller determines 406 if a new communication device 110-112 is in the conference. If a new communication device 110-112 is in the conference, the controller determines 402 the number of participants for the communication device 110-112. Otherwise, the mixer 102 determines 407 if the conference call is complete. If the conference call is not complete, the controller 103 determines 406 if a new communication device 110-112 is in the conference. Otherwise, if the conference call is complete in step 407, the mixer 102 generates 408 a conference record 109 and stores the conference record 109 in the database 105.

Figure 5:
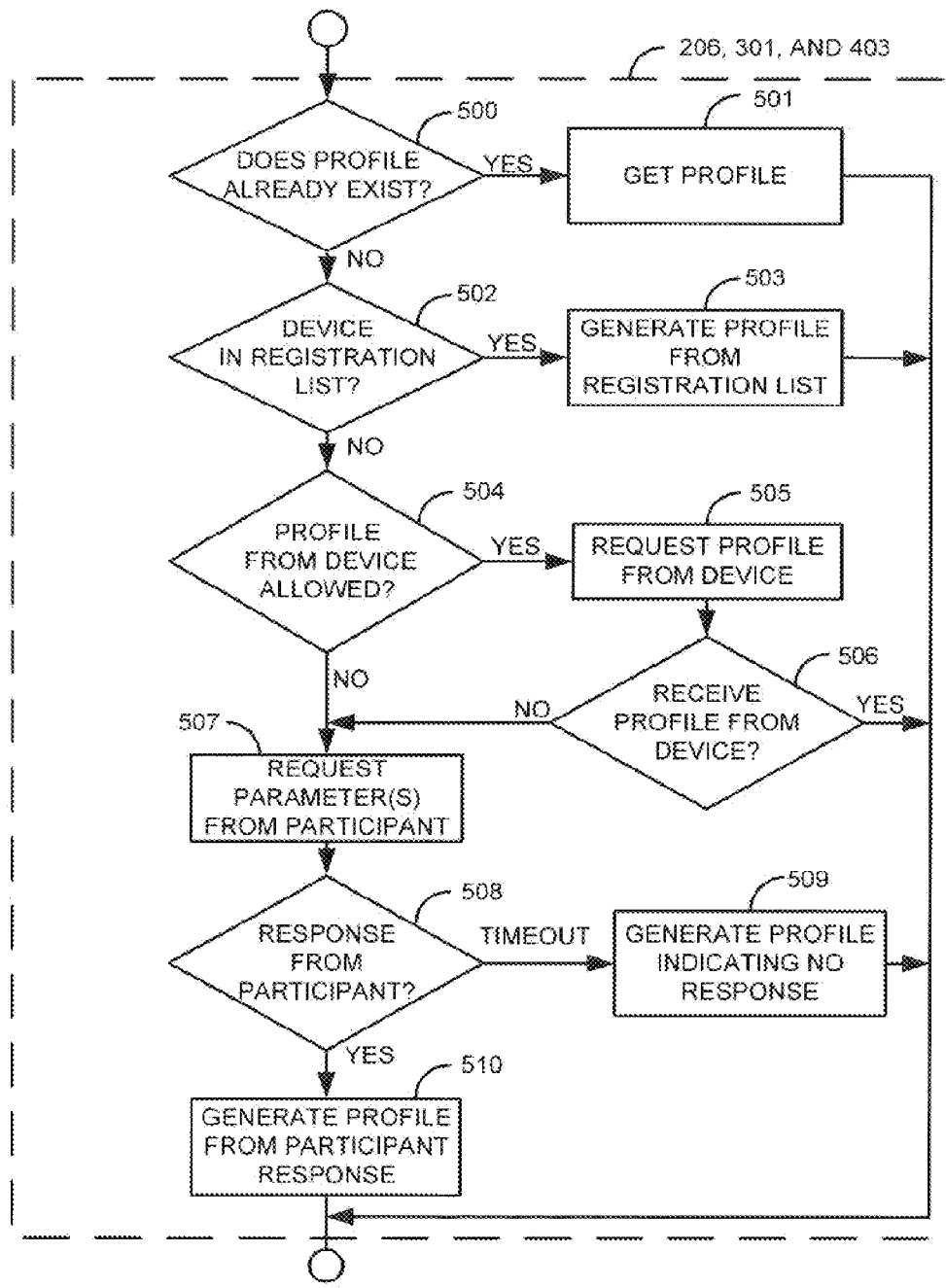
FIG. 5 is a computer-implemented method of getting a profile for each participant.

FIG. 5 is a computer-implemented method of getting a profile 107 for each participant. FIG. 5 is a detailed flow diagram of step 206 in FIG. 2, step 301 in FIG. 3, and step 403 in FIG. 4. The process begins by determining 500 if a profile 107 for the participant already exists. A profile 107 can exist in the data base 105. The controller 103 can get the profile 107 if a profile 107 is associated with the communication device's telephone number. If there are multiple participants on a communication device 110-112, the participant could enter their extension followed by the # key, which allows the controller 103 to go and get the profile 107 for the participant. If the profile 107 exists in step 500, the controller gets 501 the profile 107 and this step (206, 301, or 403) is completed.

If the profile 107 does not already exist in step 500, the controller 103 determines 502 if the communication device 110-112 is in the registration list 104. The controller 103 can get a telephone number from the registration list 104 and see if the telephone number or telephone prefix matches the telephone number of the communication device 110-112. If there is a match in step 502, the controller 103 generates 503 a profile 107 from the registration list 104 and this step (206, 301, or 403) is completed.

If the communication device 110-112 is not in the registration list 104 in step 502, the controller 103 determines 504 if a profile 107 from the communication device 110-112 is allowed. If a profile 107 from the communication device 110-112 is allowed in step 504, the controller 103 requests 505 a profile 107 from the communication device 110-112. The controller 103 waits to receive 506 a profile 107 from the communication device 110-112. If a profile 107 is received from the communication device in step 506, this step (206, 301, or 403) is completed.

Otherwise, if the controller 103 did not receive the profile 107 from the communication device 110-112 in step 506 or if profiles 107 from a communication device 110-112 are not allowed in step 504, the controller 103 requests 507 parameter(s) 108 from the participant. If a response is received in step 508, a profile 107 is generated 510 from the parameters 108 received in step 507. Otherwise, if no response is received in step 508 and the process times out, the controller 103 generates 509 a profile 107 with a parameter 108 indicating that the participant did not provide a response. In either case, this step (206, 301, or 403) is now completed.

Figure 6:
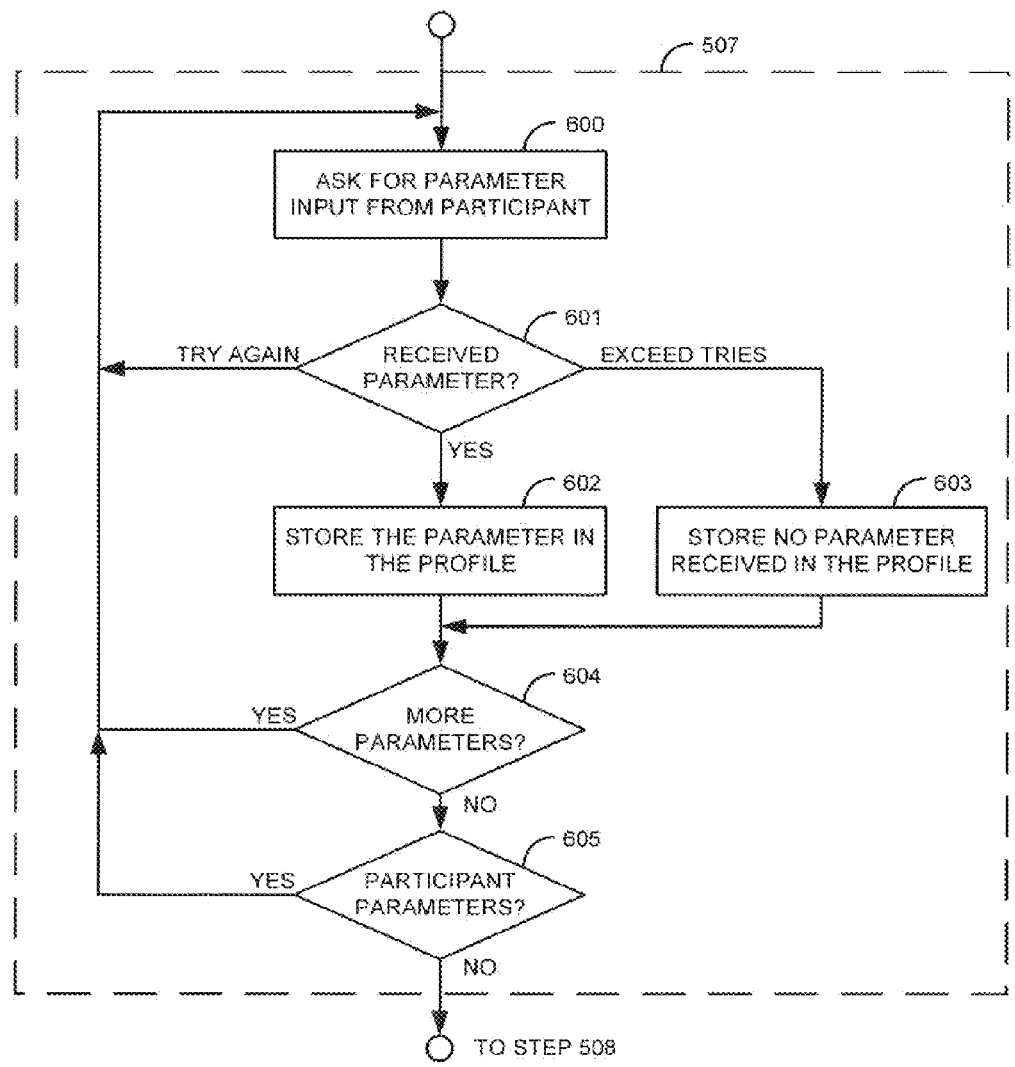
FIG. 6 is a computer-implemented method for parsing voice input to generate a profile.

FIG. 6 is a computer-implemented method for parsing voice input to generate a profile 107. FIG. 6 is a flow diagram of step 507 in FIG. 5. The controller 103 asks 600 for parameter 108 input from a participant and waits to receive 601 a parameter 108 from the participant. If the controller 103 did not receive a parameter 108 from the participant and is set up to try to get the parameter 108 again, the controller 103 again asks 600 for parameter 108 input from the participant. If the controller 103 did not receive a parameter 108 from the participant in step 601 and has exceeded the allowed number of tries, the controller 103 stores 603 an indication that that no parameter 108 was received in the profile 107. If a parameter 108 is received in step 601, the controller stores 602 the parameter 108 in the profile 107. In this example, the controller 103 converts the participant's voice response into text and/or records the response from the participant. The controller determines 604 if more required parameters 108 are necessary. If more parameters 108 are required in step 604, the controller asks 600 for parameter 108 input from the participant.

Otherwise, the controller 103 asks 605 if there are parameters 108 that can be defined by a participant. As an example, the participant could be asked to hit 9 for yes and 6 for no. If the participant entered 9 for yes, the controller can ask for parameters 108 in a variety of ways. For example, the controller 103 can ask 600 the participant if the participant wants to input the parameter name followed by the * key and the parameter 108 followed by the # key. Once the controller 103 receives 601 the participant-defined parameter 108, the controller 103 stores 602 the parameter 108 in the profile 107. The controller 103 determines 604 that there are no more required parameters 108. The controller 103 asks 605 if there are more parameters 108 to be entered by the participant. If the participant does not want to input parameters 108, the process goes to step 508.

The controller 103 could accomplish the method of FIG. 6 in a variety of ways. For example, if the participant is on communication device 111, the controller 103 asks 600 the participant to "speak your name followed by the * key" by sending a first voice message to the communication device 111. Communication device 111 receives the first voice message from the controller 103 and plays the first voice message to the participant. The participant enters the first parameter 108 by speaking their name and keying in the *. Communication device 111 sends the first parameter 108 to the controller 103. The controller 103 receives 601 the first parameter 108 from communication device 111. The controller 103 stores 602 the first parameter in the profile 107.

The controller 103 determines 604 that that there are two additional required parameters 108 (title and company). The controller 103 asks 600 the participant to "speak your title followed by the * key" by sending a second voice message to communication device 111. Communication device 111 receives the second voice message from the controller 103 and plays the second voice message to the participant. The participant inputs parameter 108 by speaking their title and keying in the *. Communication device 111 sends the second parameter 108 to the controller 103. The controller 103 receives 601 the second parameter 108 from communication device 111. The controller 103 stores 602 the second parameter 108 in the profile 107.

The controller 103 determines 604 that there is one more required parameter 108 (company). The controller 103 asks 600 the participant to "speak your company name followed by the # key" by sending a third voice message to the communication device 111. Communication device 111 receives the third voice message from the controller 103 and plays the third vice message to the participant. The participant speaks their company name and keys in the #. The communication device 111 sends the third parameter 108 to the controller 103. The controller 103 receives 601 the third parameter 108 from communication device 111. The controller 103 stores 602 the third parameter 108 in the profile 107. The controller determines 604 that there are no more required parameters 108 and proceeds to step 605.

The controller 103 determines 605 if the participant wants to input an additional parameter by asking the participant to "enter 9 if you want to input an additional parameter or 6 if you want to end" by sending a fourth voice message to the communication device 111. The communication device 111 receives the fourth voice message from the controller 103 and plays the fourth voice message to the participant. The participant hits the 9 key. The communication device 111 sends the 9 DTMF tone to the controller 103. The controller 103 determines 605 that the participant wants to input additional parameters 108. The controller 103 asks 600 the participant to "speak the parameter name followed by the * key and then speak the parameter 108 followed by the # key" by sending a fifth message to the communication device 111. The communication device 111 receives the fifth voice message from the controller 103 and plays the fifth voice message to the participant. The participant speaks the parameter name, keys in *, speaks the parameter 108, and keys in #. The communication device 111 sends the fourth parameter name and the fourth parameter 108 to the controller 103. The controller 103 receives 601 the fourth parameter 108 from the communication device 111. The controller 103 stores 602 the fourth parameter name and the fourth parameter 108 in the profile 107. The controller 103 determines 604 that there are no more required parameters 108. The controller 103 determines 605 if the participant wants to input an additional parameter by asking the participant to "enter 9 if you want to input an additional parameter or 6 if you want to end." The controller 103 sends a sixth voice message to communication device 111. Communication device 111 plays the voice message to the participant. The participant hits the 6 key. The communication device 111 sends the 6 DTMF tone to the controller 103. The controller 103 determines 605 that the participant is done imputing additional parameters 108. The process goes to step 508.

Figure 7:
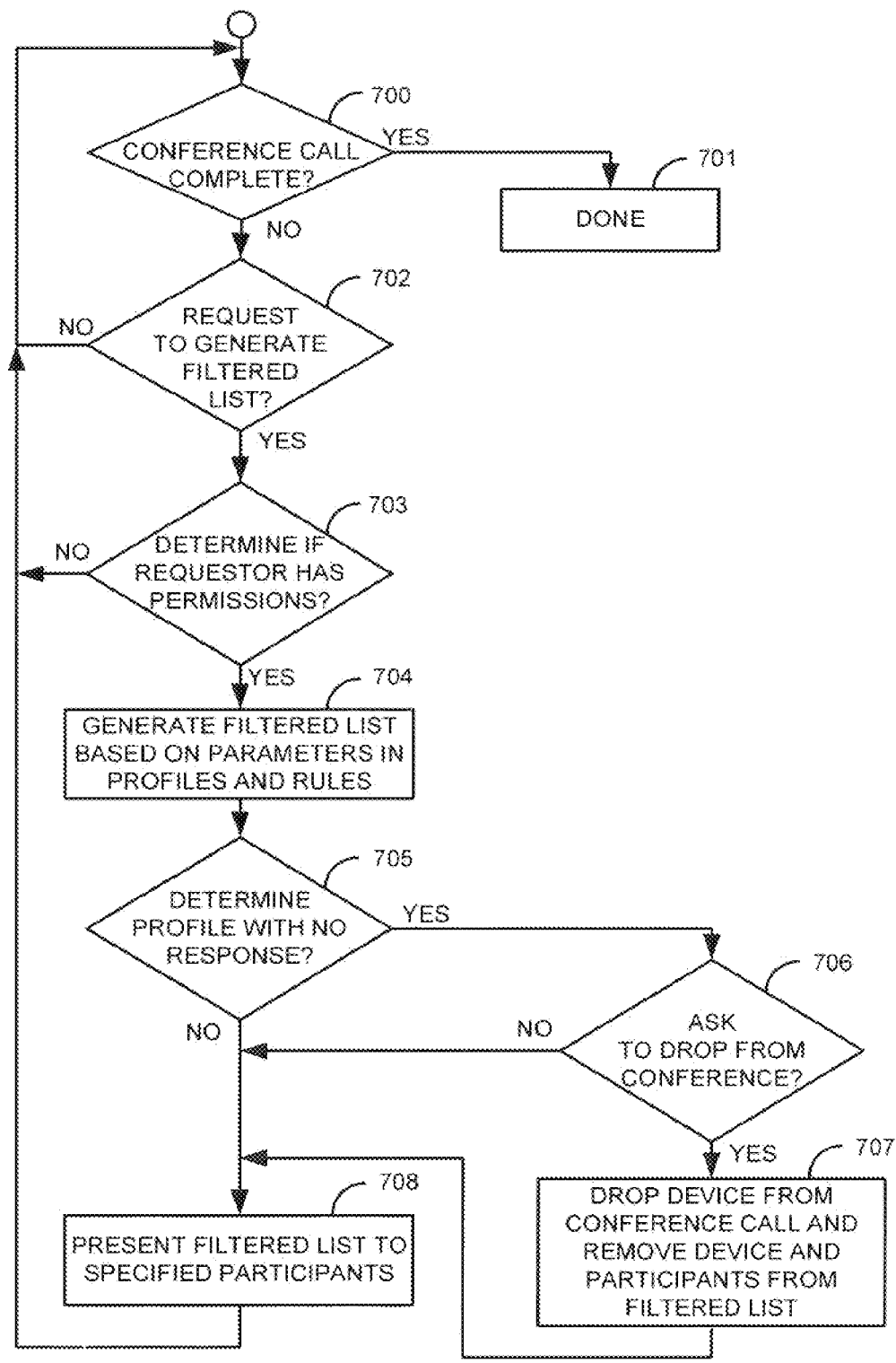
FIG. 7 is a computer-implemented method for generating and presenting filtered lists of participants.

FIG. 7 is a computer-implemented method for generating and presenting filtered lists of participants. The process begins after a conference call is established. The process determines 700 if the conference call is complete. If the conference call is complete in step 700, the process is done 701. Otherwise, the controller 103 waits for a request 702 to generate a filtered list of participants. If no request to generate a filtered list of participants is received in step 702, the process goes to step 700. If a request to generate a filtered list of participants is received in step 702, the controller 103 determines 703 if the requestor has permissions. Permissions define the rights each participant on each communication device 110-112 has in relation to the filtered list. If the requester does not have permissions in step 703, the process goes to step 700. Otherwise, if the requestor does have permissions in step 703, the controller 103 generates 704 the filtered list of participants based on one or more parameters 108 in the profiles 107 of the participants and rules on how to generate the filtered list of participants. A rule could be, for example, *4 means to generate a filtered list only for the host of the conference call.

The controller 103 determines 705 if a profile has one or more parameters 108 where the participant did not respond (see step 603). If the profile 107 does not have a parameter 108 where the participant did not respond, the process goes to step 708. Otherwise, if one of the profiles 107 in the filtered list of participants has a parameter 108 where the participant did not respond, the process asks 706 the requestor if the requestor wants to drop the communication device 110-112 of the participant who did not respond. If the requestor does not want to drop the communication device 110-112 from the conference, the process goes to step 708. Otherwise, the communication device 110-112 is dropped 707 from the conference call and the participants are removed from the filtered list of participants. The filtered list of participants is then presented 708 to the specified participants. The filtered list of participants can be presented in various ways, such as a voice message, on a display in the communication device 110-112, printed on a printer, and the like.

There are various ways that the controller 103 can generate 704 a filtered list of participants based on parameters 108 in the profiles 107 and rules. For example, assume that the requestor is the host of the conference and that there are rules that the host has full permissions, *4#(extension) will play a list of all participants at the extension to the requestor, and *3 will play the list of all participants to all communication devices 110-112 on the conference. Also assume that there are rules that all communication devices 110-112 are permitted to use the *4#(extension) command and that only the host can use the *3 command.

A conference call is established between communication devices 110-112. The host is on communication device 110. Once the host inputs the *3 command, the controller 103 determines 703 that the host has permissions. The controller 103 generates 704 a filtered list of all participants on communication devices 110-112. The filtered list is played (presented) 705 on all the communication devices 110-112. If a participant on communication device 112 input the *3 command, the controller 103 would determine 703 that the requestor does not have permissions and would deny the request.

If the participant on communication device 112 input the command *4#111, the controller 103 determines 703 that the requestor has permissions. The controller 103 generates 704 a filtered list of all participants on communication device 111. The controller 103 plays (presents) 705 the filtered list of all participants on communication device 111 to the participant(s) on communication device 112.

Of course, various changes and modifications to the illustrative embodiment described above will be apparent to those skilled in the art. These changes and modifications can be made without departing from the spirit and the scope of the system and method and without diminishing its attendant advantages. It is therefore intended that such changes and modifications be covered by the following claims except insofar as limited by the prior art.

What is claimed is:

1. A system for managing conference calls comprising:
    a mixer configured to establish a conference call between a plurality of communication devices, wherein each communication device has at least one participant; and
    a controller configured to:
        determine, for each communication device of the plurality of communication devices and when each communication device connects to the conference call, a number of the participants on said communication device, wherein the number of participants on at least one of the plurality of communication devices comprises a plurality of participants;
        get a first set of profiles each containing at least one parameter for one of the participants, wherein there is a profile for each participant;
        receive an identification of at least a first parameter to use to filter the first set of profiles;
        determine from the first set of profiles a second set of profiles containing the at least a first identified parameter;
        generate a filtered list of the participants based on the second set of profiles and permissions defining the rights of each participant;
        present the filtered list of the participants to specified participants; and
        leverage the profiles in conjunction with determining the filtered list of participants on the conference to provide dynamic filtering via the controller, wherein the controller is configured to determine the number of the participants on each communication device of the plurality of communication devices sequentially or in parallel.

2. The system of claim 1, wherein the controller is configured to generate a first profile of the first set of profiles by parsing voice input from a first one of the participants on a first one of the plurality of communication devices to create at least one parameter in the first profile.

3. The system of claim 2, wherein the controller is configured to generate a second profile of the first set of profiles by parsing voice input from a second one of the participants on the first one of the plurality of communication devices to create at least one parameter in the second profile.

4. The system of claim 3, wherein the parsing is accomplished by using DTMF to separate at least one parameter in at least one profile in the first set of profiles.

5. The system of claim 1, wherein the controller is configured to allow a participant of the participants to request a new said profile.

6. The system of claim 1, wherein the controller is configured to get at least one profile of the plurality of profiles from a database.

7. The system of claim 1, wherein the controller is configured to generate at least one profile of the plurality of profiles based on a registration list.

8. The system of claim 1, wherein the filtered list of the participants is generated based on the at least one parameter selected from the group comprising: a name, a title, a job function, a company, a telephone prefix, an area code, a duration the participant was on the conference call, a start time of the participant on the conference call, an end time of the participant on the conference call, and a telephone number.

9. The system of claim 1, wherein the mixer is configured to drop a communication device of the plurality of communication devices from the conference call if one of the participants on the communication device has a profile with a parameter that indicates that the participant did not respond.

10. The system of claim 1, wherein the filtered list of the participants is presented to all of the participants in the conference call.

11. The system of claim 1, wherein the filtered list of the participants is presented to only a subset of the participants in the conference call.

12. The system of claim 1, wherein the mixer is configured to generate a conference record using each profile for each of the participants on each communication device.

13. The system of claim 12, wherein the controller is configured to generate a filtered list of the participants from the conference record.

14. The system of claim 1, wherein the filtered list of the participants is presented by at least one device selected from the group comprising: a speaker, a printer, and a video display.

15. The system of claim 1, wherein the conference call is an item selected from the group comprising: a voice conference call, a chat conference call, a multimedia conference call, and a video conference call.

16. The system of claim 1, wherein at least one of the participants can define an additional parameter in the profile of the at least one of the participants.

17. The system of claim 1, wherein the filtered list of the participants is a list of all of the participants on one of the plurality of communication devices.

18. The system of claim 1, wherein the filtered list of the participants is generated based on rules.

19. The system of claim 1, wherein the controller is configured to determine if at least one of the participants has permissions.

20. A computer-implemented method for managing conference calls comprising:
   establishing a conference call between a plurality of communication devices, wherein each communication device has at least one participant;
   determining a number of the participants on each communication device of the plurality of communication devices when each communication device connects to the conference call, wherein the number of participants on at least one of the plurality of communication devices comprises a plurality of participants;
   getting a profile for each of the participants on each communication device, wherein each said profile contains at least one parameter;
   creating a first set of profiles for all the participants;
   receiving at least one parameter from which to filter the first set of profiles;
   determining a second set of profiles containing the at least one received parameter;
   generating a filtered list of the participants based on the second set of profiles and permissions defining the rights of each participant;
   presenting the filtered list of the participants to specified participants; and
   leveraging the profiles in conjunction with determining the filtered list of participants on the conference to provide dynamic filtering via the controller, wherein the step of determining the number of the participants on each communication device of the plurality of communication devices is accomplished sequentially or in parallel.

21. The method of claim 20, further comprising the step of: generating a first profile of the profiles by parsing voice input from a first one of the participants on a first one of the plurality of communication devices to create the at least one parameter in the first profile.

22. The method of claim 21, further comprising the step of: generating a second profile of the profiles by parsing voice input from a second one of the participants on the first one of the plurality of the communication devices to create the at least one parameter in the second profile.

23. The method of claim 22, wherein the parsing is accomplished by using DTMF to separate at least one parameter in at least one profile in the plurality of profiles.

24. The method of claim 20, further comprising the step of: allowing a participant of the participants to request a new said profile.

25. The method of claim 20, wherein the step of getting the profile for each of the participants on each communication device further comprises: getting at least one of the profiles from a database.

26. The method of claim 20, further comprising the step of: generating at least one of the profiles based on a registration list.

27. The method of claim 20, wherein the step of determining the number of the participants on an individual communication device of the plurality of communication devices is accomplished when the individual communication device connects to the conference call.

28. The method of claim 20, wherein the filtered list of the participants is generated based on the at least one parameter selected from the group comprising: a name, a title, a job function, a company, a telephone prefix, an area code, a duration the participant was on the conference call, a start time of the participant on the conference call, an end time of the participant on the conference call, and a telephone number.

29. The method of claim 20, further comprising the step of: dropping a communication device of the plurality of communication devices from the conference call if the parameter of the profile of one of the participants on the communication device indicates that the one participant did not respond.

30. The method of claim 20, wherein the filtered list of the participants is presented to all of the participants in the conference call.

31. The method of claim 20, wherein the filtered list of the participants is presented to only a subset of the participants in the conference call.

32. The method of claim 20, further comprising the step of: generating a conference record using each said profile for each of the participants on each said communication device.

33. The method of claim 32, further comprising the step of: generating a filtered list of the participants from the conference record.

34. The method of claim 20, wherein the filtered list of the participants is presented by at least one device selected from the group comprising: a speaker, a printer, and a video display.

35. The method of claim 20, wherein the conference call is an item selected from the group comprising: a voice conference call, a chat conference call, a multimedia conference call, and a video conference call.

36. The method of claim 20, wherein at least one of the participants can define an additional parameter in the profile of the one participant.

37. The method of claim 20, wherein the filtered list of the participants is a list of all the participants on one of the plurality of communication devices.

38. The method of claim 20, wherein the filtered list of the participants is generated based on rules.

39. The method of claim 20, wherein generating the filtered list of the participants further comprises the step of: determining if at least one of the participants has permissions using a controller.

40. A system for managing conference calls comprising:
   a mixer configured to establish a conference call between a plurality of communication devices, wherein each communication device has at least one participant; and
   a controller configured to:
      determine a number of the participants on each communication device of the plurality of communication devices when each communication device connects to the conference call, wherein the number of participants on at least one of the plurality of communication devices comprises a plurality of participants;
      generate a first profile by parsing voice input from a first one of the participants on a first one of the communication devices to create at least one parameter in the first profile;
      generate a second profile by parsing voice input from a second one of the participants on the first one communication device to create at least one parameter in the second profile;
      get the profile that contains the at least one parameter for each of the participants on each one of the communication devices;
      receive at least one parameter from which to filter the first and second profiles;
      determine which of the first and second profiles contains the at least one received parameter;

generate a filtered list of the participants based on which of the first and second profiles contains the at least one received parameter and permissions defining the rights of each participant;

present the filtered list of the participants to specified participants; and leverage the profiles in conjunction with determining the filtered list of participants on the conference to provide dynamic filtering via the controller, wherein the controller is configured to determine the number of the participants on each communication device of the plurality of communication devices sequentially or in parallel.

41. A computer-implemented method for managing conference calls comprising:

establishing a conference call between a plurality of communication devices, wherein each communication device has at least one participant;

determining, when each communication device connects to the conference call, a number of the participants on each communication device of the plurality of communication devices, wherein the number of participants on at least one of the plurality of communication devices comprises a plurality of participants;

generating a first profile by parsing voice input from a first one of the participants on a first one of the communication devices to create at least one parameter in the first profile;

generating a second profile by parsing voice input from a second one of the participants on the first one communication device to create at least one parameter in the second profile;

getting the profile of each of the participants on each of the communication devices, wherein each said profile contains the at least one parameter;

receiving at least one parameter from which to filter the first and second profiles;

determining which of the first and second profiles contains the at least one received parameter;

generating a filtered list of the participants based on which of the first and second profiles contains the at least one received parameter and permissions defining the rights of each participant;

presenting the filtered list of the participants to specified participants; and leveraging the profiles in conjunction with determining the filtered list of participants on the conference to provide dynamic filtering via the controller, wherein the step of determining the number of the participants on each communication device of the plurality of communication devices is accomplished sequentially or in parallel.

* * * * *